US008027419B2

(12) United States Patent
Iannuzzelli et al.

(10) Patent No.: US 8,027,419 B2
(45) Date of Patent: Sep. 27, 2011

(54) METHOD FOR ALIGNMENT OF ANALOG AND DIGITAL AUDIO IN A HYBRID RADIO WAVEFORM

(75) Inventors: Russell Iannuzzelli, Bethesda, MD (US); Brian William Kroeger, Sykesville, MD (US); Harvey Chalmers, Rockville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 1457 days.

(21) Appl. No.: 11/101,795

(22) Filed: Apr. 8, 2005

(65) Prior Publication Data

US 2006/0227814 A1 Oct. 12, 2006

(51) Int. Cl.
*H04B 1/10* (2006.01)

(52) U.S. Cl. ........ 375/349; 370/516; 370/490; 375/293; 455/130

(58) Field of Classification Search .................. 375/219, 375/316, 354
See application file for complete search history.

(56) References Cited

U.S. PATENT DOCUMENTS

| | | | | |
|---|---|---|---|---|
| 3,689,841 | A * | 9/1972 | Bello et al. | 375/216 |
| 4,192,003 | A | 3/1980 | Brock et al. | |
| 4,371,953 | A * | 2/1983 | Hyatt | 365/103 |
| 4,382,299 | A * | 5/1983 | Dieterich | 360/32 |
| 4,759,069 | A * | 7/1988 | Bernstein et al. | 381/56 |
| 4,817,014 | A * | 3/1989 | Schneider et al. | 708/422 |
| 5,095,507 | A * | 3/1992 | Lowe | 381/17 |
| 5,483,373 | A * | 1/1996 | Bulow et al. | 398/185 |
| 5,675,612 | A | 10/1997 | Solve et al. | |
| 5,859,870 | A | 1/1999 | Tsujimoto | |
| 6,047,016 | A * | 4/2000 | Ramberg et al. | 375/148 |
| 6,148,008 | A | 11/2000 | Okamoto | |
| 6,590,944 | B1 | 7/2003 | Kroeger | |
| 6,683,919 | B1 * | 1/2004 | Olgaard et al. | 375/316 |
| 6,735,257 | B2 | 5/2004 | Kroeger | |
| 6,937,723 | B2 * | 8/2005 | Boland et al. | 379/406.06 |
| 7,088,740 | B1 * | 8/2006 | Schmidt | 370/490 |
| 2001/0012316 | A1 | 8/2001 | Maruyama | |
| 2003/0189989 | A1 | 10/2003 | Kroeger | |
| 2004/0043730 | A1 * | 3/2004 | Schill et al. | 455/130 |
| 2004/0076188 | A1 | 4/2004 | Milbar et al. | |

FOREIGN PATENT DOCUMENTS

| | | | |
|---|---|---|---|
| EP | 1370016 | A1 | 12/2003 |
| JP | 8265217 | A | 10/1996 |
| JP | 2003289278 | A | 10/2003 |

* cited by examiner

*Primary Examiner* — Shuwang Liu
*Assistant Examiner* — Lihong Yu
(74) *Attorney, Agent, or Firm* — Robert P. Lenart, Esq.; Pietragallo Gordon Alfano Bosick & Raspanti, LLP

(57) ABSTRACT

This invention provides a method of detecting time alignment of an analog audio signal and a digital audio signal in a hybrid radio system. The method comprises the steps of filtering the analog audio signal to produce a filtered analog audio signal, filtering the digital audio signal to produce a filtered digital audio signal, and using the filtered analog audio signal and the filtered digital audio signal to calculate a plurality of correlation coefficients, wherein the correlation coefficients are representative of time alignment between the analog audio signal and the digital audio signal. An apparatus for performing the method is also provided.

15 Claims, 5 Drawing Sheets

METHOD FOR ALIGNMENT OF ANALOG AND DIGITAL AUDIO IN A HYBRID RADIO WAVEFORM

FIELD OF THE INVENTION

This invention relates to signal processing, and more particularly to methods and apparatus for detecting and controlling alignment of digital and analog audio signals in an in-band on-channel broadcasting system.

BACKGROUND OF THE INVENTION

The iBiquity Digital Corporation HD Radio™ system is designed to permit a smooth evolution from current analog amplitude modulation (AM) and frequency modulation (FM) radio to a fully digital in-band on-channel (IBOC) system. This system delivers digital audio and data services to mobile, portable, and fixed receivers from terrestrial transmitters in the existing medium frequency (MF) and very high frequency (VHF) radio bands. Broadcasters may continue to transmit analog AM and FM signal simultaneously with the new, higher-quality and more robust digital signals, allowing themselves and their listeners to convert from analog to digital radio while maintaining their current frequency allocations.

The system provides a flexible means of transitioning to a digital broadcast system by providing three waveform types: Hybrid, Extended Hybrid, and All Digital. The Hybrid and Extended Hybrid types retain the analog FM signal, while the All Digital type does not. All three waveform types conform to the currently allocated spectral emissions mask. Details on the Hybrid, Extended Hybrid, and All Digital waveforms are shown in United States Patent Application Publication No. 2004/0076188, which is hereby incorporated by reference.

The digital signal is modulated using Orthogonal Frequency Division Multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

During the transition from analog to digital broadcasting, it is envisioned that the predominant transmit modes for the HD Radio™ system will be the Hybrid modes. The Hybrid signal includes the conventional analog signal (for compatibility with existing radios) as well as digital signal subcarriers carrying the same analog audio content, but in higher-quality digital format. The digital signal is delayed with respect to its analog counterpart such that this time diversity can be used to mitigate the effects of short signal outages. In these modes, hybrid-compatible digital radios will incorporate a feature called "blend" which attempts to smoothly transition from outputting digital audio to analog audio during initial tuning, or whenever the digital waveform quality falls below an acceptable level. The blend function is described in U.S. Pat. Nos. 6,590,944 and 6,735,257, which are hereby incorporated by reference.

Blending will typically occur at the edge of digital coverage and at other locations within the coverage contour where the digital waveform is corrupted. When a short outage does occur, such as traveling under a bridge, the loss of digital audio is replaced by an analog signal. When blending occurs, it is important that the content on the analog audio and digital audio channels are aligned in both time and level to ensure that the transition is barely noticed by the listener. Optimally, the listener will notice little other than possible inherent quality differences in analog and digital audio at these blend points. However, if the broadcast station does not have the analog and digital audio signals aligned, then the result could be a harsh sounding transition between digital and analog audio. The misalignment may occur because of audio processing differences between the analog audio and digital audio paths at the broadcast facility. Furthermore the analog and digital signals are typically generated with two separate signal generation paths before combining for output. The use of different analog processing techniques and different signal generation methods makes the alignment of these two signals nontrivial. The blending must be smooth and continuous, which can happen only if the analog and digital audio is both time and level aligned.

The alignment or calibration of an HD Radio™ broadcast station's digital and analog signals is presently done manually with test equipment located at the transmitter site. This calibration requires the use of a test signal and special measurement equipment used to measure the time and level differences of the analog and digital signals. It also accounts for the intentional diversity delay imposed on the analog signal path. Furthermore the relative delays may change occasionally if the audio processing is changed, which may occur if or when the broadcast changes from music to news, for example. It is presently impractical, or cumbersome, to manually realign the signals when these modifications occur. Therefore it would be a significant benefit and convenience if the ability to automatically detect and correct alignment errors were available.

SUMMARY OF THE INVENTION

This invention provides a method of detecting time alignment of an analog audio signal and a digital audio signal in a hybrid radio system. The method comprises the steps of filtering the analog audio signal to produce a filtered analog audio signal, filtering the digital audio signal to produce a filtered digital audio signal, and using the filtered analog audio signal and the filtered digital audio signal to calculate a plurality of correlation coefficients, wherein the correlation coefficients are representative of time alignment between the analog audio signal and the digital audio signal.

The invention also encompasses an apparatus for detecting time alignment of an analog audio signal and a digital audio signal in a radio system. The apparatus comprises a first filter for filtering the analog audio signal to produce a filtered analog audio signal, a second filter for filtering the digital audio signal to produce a filtered digital audio signal, and a processor for using the filtered analog audio signal and the filtered digital audio signal to calculate a plurality of correlation coefficients, wherein the correlation coefficients are representative of alignment between the analog audio signal and the digital audio signal.

In another aspect, the invention provides a method of detecting level alignment of an analog audio signal and a digital audio signal in a hybrid radio system. The method comprises the steps of filtering the analog audio signal to produce a filtered analog audio signal, filtering the digital audio signal to produce a filtered digital audio signal, computing the signal power of the analog audio signal and the signal power of the digital audio signal for an audio segment, and using a ratio of the signal power of the analog audio signal and the signal power of the digital audio signal to produce a signal representative of the level alignment of the analog audio signal and the digital audio signal.

The invention further encompasses an apparatus for detecting level alignment of an analog audio signal and a digital audio signal in a hybrid radio system. The apparatus comprises a first filter for filtering the analog audio signal to produce a filtered analog audio signal, a second filter for filtering the digital audio signal to produce a filtered digital audio signal, and a processor for computing the signal power of the analog audio signal and the signal power of the digital audio signal for an audio segment, and for using a ratio of the signal power of the analog audio signal and the signal power of the digital audio signal to produce a signal representative of the level alignment of the analog audio signal and the digital audio signal.

DETAILED DESCRIPTION OF THE INVENTION

Time and level alignment between the analog audio and digital audio of a HD Radio™ waveform is critical to assure a smooth blend from digital to analog in the HD Radio™ system. This invention provides a method and apparatus for verifying proper station analog/digital alignment (in both time and level). In addition, the invention can be used in a feedback design to automatically correct the misalignment of the analog audio and digital audio at the broadcast facility.

Figure 1:
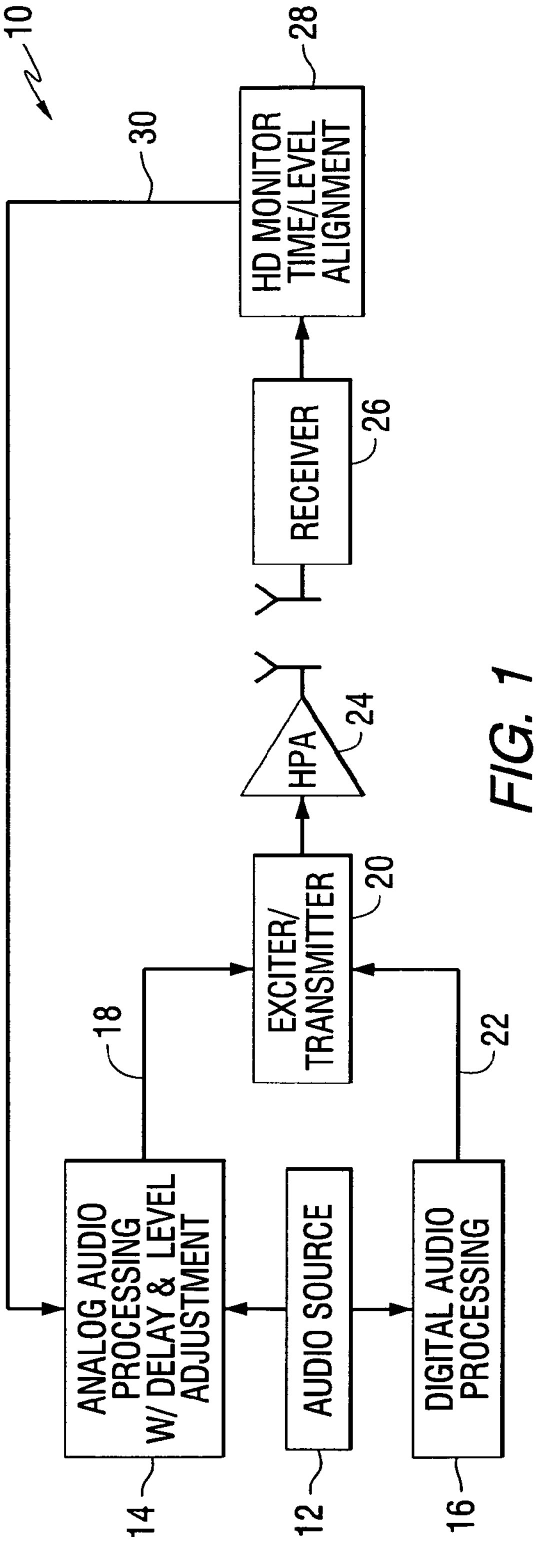
FIG. 1 is a block diagram of an in-band on-channel broadcast system with a time/level monitor and feedback.

FIG. 1 is a block diagram of an in-band on-channel broadcast system 10 including means for monitoring the analog and digital signals, and a feedback path. An audio source 12 provides an audio signal to an analog audio processor 14 and a digital audio processor 16. The analog processor produces an analog audio signal on line 18 that is passed to an exciter/transmitter 20. The digital processor produces a digital audio signal on line 22 that is passed to the exciter/transmitter 20. The exciter/transmitter combines the analog and digital audio signals, which are then amplified by a high power amplifier 24 and transmitted in a hybrid waveform to a receiver 26. The hybrid waveform includes a carrier signal modulated by an analog audio signal and a plurality of subcarriers modulated by a digital audio signal, as illustrated in U.S. Pat. No. 6,735,257. While the subcarriers can also be modulated by other digital signals, only the digital audio signal is relevant to this description.

The receiver separates the analog and digital audio signals. The analog audio signal is sampled at the same rate as the digital audio signal. A monitor 28 receives the analog and digital audio signals from the receiver, determines the time and level alignment between the analog and digital audio signals, and produces an adjustment signal on line 30, that can be fed back to the broadcasting station and used to adjust the relative timing and level of the analog audio and digital audio signals. In the example illustrated in FIG. 1, the adjustment signal is delivered to the analog audio signal processor and used to adjust the delay and level of the analog audio signal. However, the adjustment signal could similarly be fed to the digital audio processor and used to adjust the timing and level of the digital audio signal.

This invention provides a method for detecting the relative alignment of the analog audio and digital audio in both time and level. This method does not require a test waveform to be transmitted. This method can be incorporated into a system that monitors a broadcast station's hybrid waveform. In addition, with specific knowledge of the blend algorithm used in the receivers, the measured alignment information can be used to develop a feedback path to the broadcasting station so that, as audio processing changes between analog and digital paths in a station, a signal representative of the relative alignment can be fed back to the station to keep the analog and digital audio content aligned, thus persevering the receiver's ability to smoothly blend between the analog and digital audio.

Although a dedicated measurement device could be implemented to measure time and level alignment, it is more convenient to utilize an existing HD Radio™ receiver, which possesses most of the functionality required for the alignment measurements. One operating mode of the HD Radio™ receiver, which is important to the development of a system for monitoring signal alignment, is termed the split operating mode. A radio that is operating in the split mode outputs left, right or mono analog audio on one channel while it outputs left, right or mono digital audio on the other channel. The monophonic split mode is preferred over stereo for the measurements of interest in this invention, since the stereo images in the analog and digital audio signals may differ. Stereo image and stereo separation fidelity may be compromised in some digital audio encoders operating at high compression ratios. In the split mode, a standard audio card in a personal computer can be used as a measurement device to process information from the HD Radio™ receiver output to determine the relative alignment of the analog and digital audio.

The invention uses analog and digital audio signals that contain the same audio information. For example, each signal represents either left, right or mono audio information, although the mono mode is most useful for this measurement/calibration. It is assumed here that the analog and digital audio streams are sampled simultaneously and input into the measurement device. The metric for estimating time alignment for the analog and digital audio signals is the correlation coefficient function implemented as a normalized cross-correlation function, assuming the dc components of the analog and digital audio signals are removed. The correlation coefficient function has the property that it approaches 1 when the two signals are time aligned and identical, except for possibly an arbitrary scalar factor difference. The coefficient becomes statistically smaller as the time alignment error increases.

Since the HD Radio™ system imposed an intentional diversity delay (e.g., 4.5 seconds) on the analog signal path at the transmitter, the receiver must match this delay on the path of the digital audio. Then the analog/digital audio delays are matched at the receiver output for subsequent alignment processing. If the alignment measurement indicates a time error (due to the transmitter misalignment, assuming the pre-calibrated receiver is correct), then this error can be passed back to the transmitter component to readjust the diversity delay.

Figure 2:
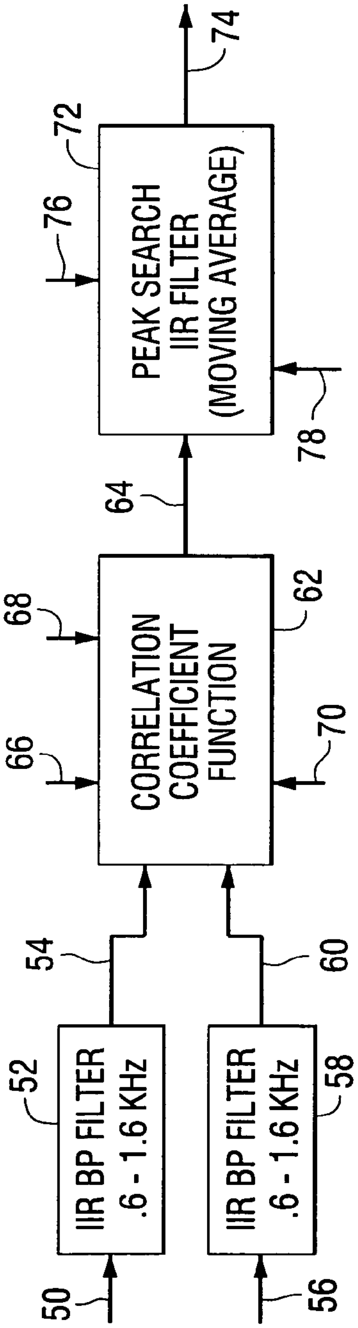
FIG. 2 is a block diagram that illustrates a time alignment measurement method.

FIG. 2 illustrates one embodiment of a process sequence for the time alignment measurement method. An analog audio signal input on line 50 is filtered using an infinite impulse response filter 52 to produce a filtered analog signal on line 54. A digital audio signal input on line 56 is filtered using an infinite impulse response filter 58 to produce a filtered digital signal on line 60. The filtered analog signal and the filtered digital signal are processed in processor 62 to produce a correlation coefficient signal on line 64. The processor includes various inputs 66, 68 and 70 for setting the number of samples per output correlation coefficient computation, the number of output correlation points, and the number of samples to be used for the average. The correlation coefficient signal on line 64 is filtered by a peak search IIR filter 72 using a moving average to produce an output signal on line 74 that is representative of the number of samples that are misaligned. The peak search filter includes inputs 76 and 78 for setting the number of samples for averaging and the correlation value lower limit.

The algorithm presumes that identically-sampled (e.g. using a 44,100 Hz sample rate) analog and digital audio signals are processed through identical digital infinite impulse response (IIR) filters. For example the IIR filters for analog and digital audio streams can be identical 10 pole elliptical filters with passbands between about 600 Hz and about 1600 Hz. The filters serve to reduce the bandwidth of the audio signals. This reduces the measurement alignment ambiguities that may occur in parts of the audio spectrum where audio processing differences are more likely to occur. For example, the analog signal will likely have a lower bandwidth than the digital signal, and filtering on the high and low frequency extremes may result in group delay differences. A filter bandwidth of roughly between 600 to 1600 Hz has been determined to be most useful for the alignment bandwidth.

The correlation coefficient $\rho_{x,y}$ between analog and digital signals represented by x and y, respectively, can be defined using statistical expectations as $$\rho_{x,y} = \frac{E\{(x-\mu_x)\cdot(y-\mu_y)\}}{\sigma_x\cdot\sigma_y},$$

where μ is the mean, and σ is the standard deviation of process x or y. The above equation is an analog generalization; however, in practice both the analog audio (e.g., x) and digital audio (e.g., y) must be identically sampled (e.g., at 44100 Hz for monophonic signals only) for the computations that follow. The mean and standard deviation of analog audio (x) and digital audio (y) over the time segment are used in this computation. The mean is the average (i.e. dc component) and standard deviation is the square root of the variance of the samples over the time segment.

The bandpass filter rejects any dc component, as well as high frequencies out of the band of interest in this computation. The mean (average) is zero since the dc is rejected here. Since the means of the analog and digital audio signals are zero after bandpass filtering and prior to the computation of the correlation coefficient, the expression can be simplified. For the discrete N-sample, zero-mean sequences x and y, the expression for the correlation coefficient ρ with lag k becomes $$\rho(k) = \frac{\sum_{n=0}^{N-1} x(n)\cdot y(n-k)}{\sqrt{\sum_{n=0}^{N-1} x^2(n)\cdot\sum_{n=0}^{N-1} y^2(n-k)}},$$

where k is the number of samples of lag between the two sequences. The lag is the relative time offset between the x and y signals. This lag allows adjustment of the relative timing so we can determine where the correlation peak occurs at a specific lag. This peak lag is then the timing offset we are trying to find/measure.

The range of k is determined by the maximum possible value of time alignment error. This maximum value of lag represents the size of the search window. Clearly we have some time/memory limits in the computations and can assume that the lag range is limited by the implementation to some practical value. The number of samples N should be sufficiently large to avoid possible group delay anomalies over short segments. Furthermore, it is preferable to use a larger value of N than to average more values of the correlation coefficient function. One way to use a large N is to compute the numerator and denominators separately over smaller time segments, then average the times epochs together before a computation of the correlation coefficient function. The epochs are time segments where the measurement occurs. Multiple epochs can then be averaged to improve the measurement accuracy/reliability over any one single epoch. Specifically, let $$z_j(k) = \left\{\sum_{n=0}^{N-1} x(n)y(n-k)\right\}_j$$

where $z_j(k)$ is defined to be the cross-correlation of x and y over the $j^{th}$ epoch of time. The epochs of time where the measurements are taken can be disconnected from other epochs of time. Let $$v_j(x) = \left\{\sum_{n=0}^{N-1} x^2(n)\right\}_j \text{ and}$$

$$v_j(y,k) = \left\{\sum_{n=0}^{N-1} y^2(n-k)\right\}_j.$$

Then ρ(k) can be represented as $$\rho(k) = \frac{z_j(k)}{\sqrt{v_j(x)v_j(y,k)}}$$

for any j (epoch of time).

If we want to average over epochs of time using a lossy integration technique, then we can define $$\overline{z_j(k)} = (1-\alpha)\overline{z_{j-1}(k)} + (\alpha)z_j(k)$$

$$\overline{v_j(x)} = (1-\alpha)\overline{v_{j-1}(x)} + (\alpha)v_j(x)$$

$$\overline{v_j(y,k)} = (1-\alpha)\overline{v_{j-1}(y,k)} + (\alpha)v_j(y,k)$$

where α is a value >0 (for infinite averaging) and <1 (for no averaging), where α is a parameter that allows adjustment of the effective time span for continuous averaging. This is a single pole lossy integrator. The lossy integrator allows the alignment to "forget" the measurements sufficiently long in the past where the audio processing parameters may be different. This filtering can be made more sophisticated by including information regarding the time between samples such that the measurements can be performed on an irregular schedule while maintaining appropriate filter coefficients.

Now we can calculate $\overline{\rho_j(k)}$ to be $$\overline{\rho_j(k)} = \frac{\overline{z_j(k)}}{\sqrt{\overline{v_j(y,k)}}\sqrt{\overline{v_j(x)}}}.$$

The correlation coefficient function computation follows the IIR filtering and typically is processed over as little as 50 milliseconds to as much as 3 seconds of data. Typically 100 to 300 milliseconds of data are sufficient to compute the correlation coefficient function. Couple this with an α of 0.1, and we obtain reasonable estimates. The correlation coefficient is computed for each lag value over its range. The number of lags computed will depend on the actual alignment per station. For example, we can choose 1000 (or whatever the maximum search range) discrete lag values over the search range, computing the correlation for each value to search for the lag with maximum correlation.

The post processing on the alignment vector performs a peak search over all correlation coefficients followed by a lower limiter on the correlation coefficient. The alignment vector is the vector (set) of lag values over the search range. If the peak correlation for any one epoch does not exceed a good threshold, then we eliminate this for the subsequent averaging over the multiple epochs. This "limiting" prevents anomalous values from being averaged. Typically 0.92 to 0.95 can be used as a lower limit to assure that the average to follow is building up on more reliable correlations. If there is a bad section of audio that does not correlate well between the analog and digital signals, then the correlation coefficient will typically be below 0.5 and this value will not be used in determining the average. Another single pole integrator can be used to accumulate the samples that pass the limiter criteria. This estimator will usually produce a very good estimate or no estimate. A no estimate condition is likely caused by the analog digital lag (±) being out of range (misaligned by too many samples). In this case the range of the correlations should be increased (number of lags increased) and the correlation run again. The limiter and the post detection averaging are required because there could be different processing applied to the analog audio and the digital audio at the broadcast facility. These different processes will lead to different group delays for different audio bands. Thus, there will be times where the correlation will be rather bad. If these segments are examined, they typically have either channel effects on the analog audio or large processing group delay differences between the digital and analog audio streams. Thus, using a limiter and single pole filter greatly stabilizes the estimate of misalignment.

Figure 3:
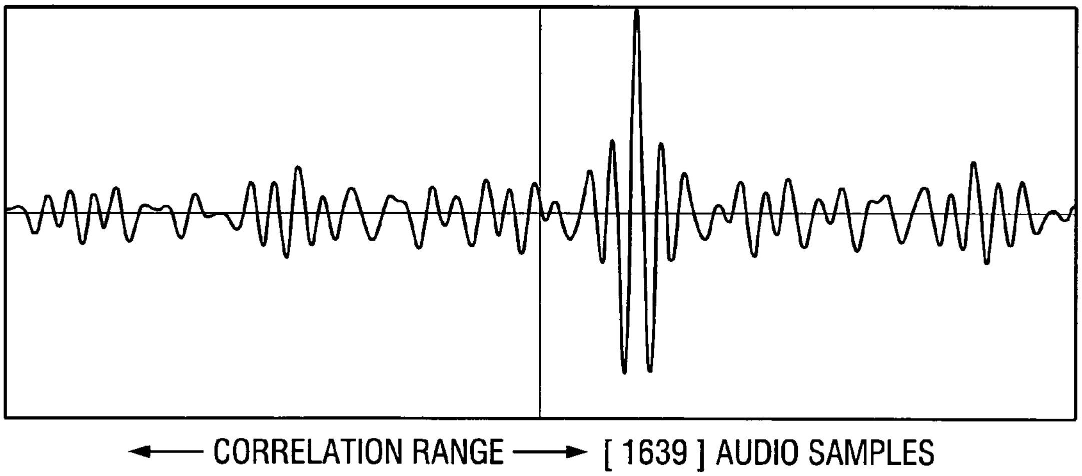
FIG. 3 is a graph of a correlation vector of correlation coefficients.

FIG. 3 is a graph of a correlation vector of correlation coefficients, showing a 152 sample misalignment. FIG. 3 shows a plot of 1639 output correlation coefficients for a particular segment of music. Each point represents the correlation of 16384 samples of analog audio and digital audio. For the maximum peak at 152 samples off center, the correlation coefficient is 0.9953, which indicates a high degree of confidence that the analog audio and digital audio are misaligned by 152 audio samples.

Figure 4:
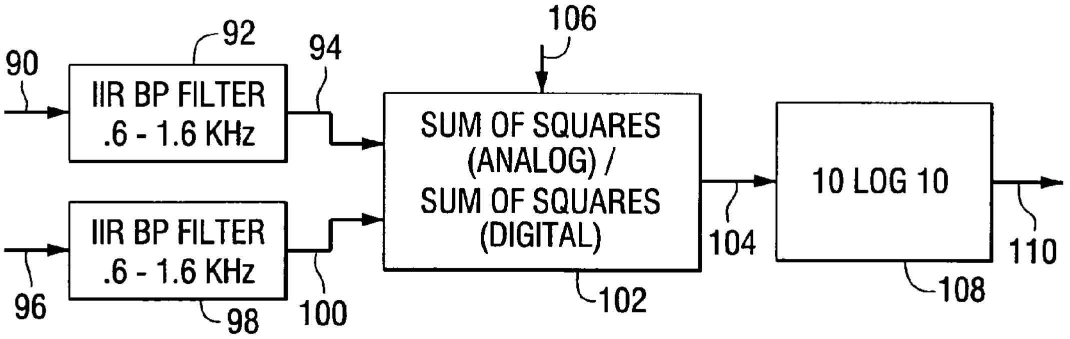
FIG. 4 is a block diagram that illustrates the level alignment algorithm.

The audio gain level alignment algorithm simply uses the same IIR filtering of the split mode inputs and compares the computed sums of the squared values of the filtered analog to the filtered digital audio signals. FIG. 4 is a block diagram that illustrates the level alignment algorithm. An analog audio signal input on line 90 is filtered using an infinite impulse response filter 92 to produce a filtered analog signal on line 94. An digital audio signal input on line 96 is filtered using an infinite impulse response filter 98 to produce a filtered digital signal on line 100. The filtered analog signal and the filtered digital signal are processed in processor 102 to produce a signal on line 104 representative of the signal power of the analog and digital signals. The processor includes an input 106 for setting the number of samples to average. The ratio of the signal powers is calculated as shown in block 108 to produce a signal on line 110 that is representative of the misalignment.

Computing the signal powers over several seconds and computing the ratio, optionally in dB, leads to a stable estimate of the level misalignment. A ratio of 1, or 0 dB, would imply that the analog and digital signals are level aligned, while any magnitude, positive or negative would imply a level misalignment. The ratio in dB is $$\text{ratio} = 10 \cdot \log\left[\frac{\sum_{n=0}^{N-1} x^2(n)}{\sum_{n=0}^{N-1} y^2(n-k)}\right].$$

The computation of the sums of squares must be done using lag value k where the analog and digital audio signals are time aligned. Specifically the signal powers must be estimated over the same audio signal segments. For efficiency, it is beneficial to accumulate the squared samples over the ranges of N samples already computed in the correlation coefficient processing that are time aligned and have a high correlation coefficient value.

Figure 5:
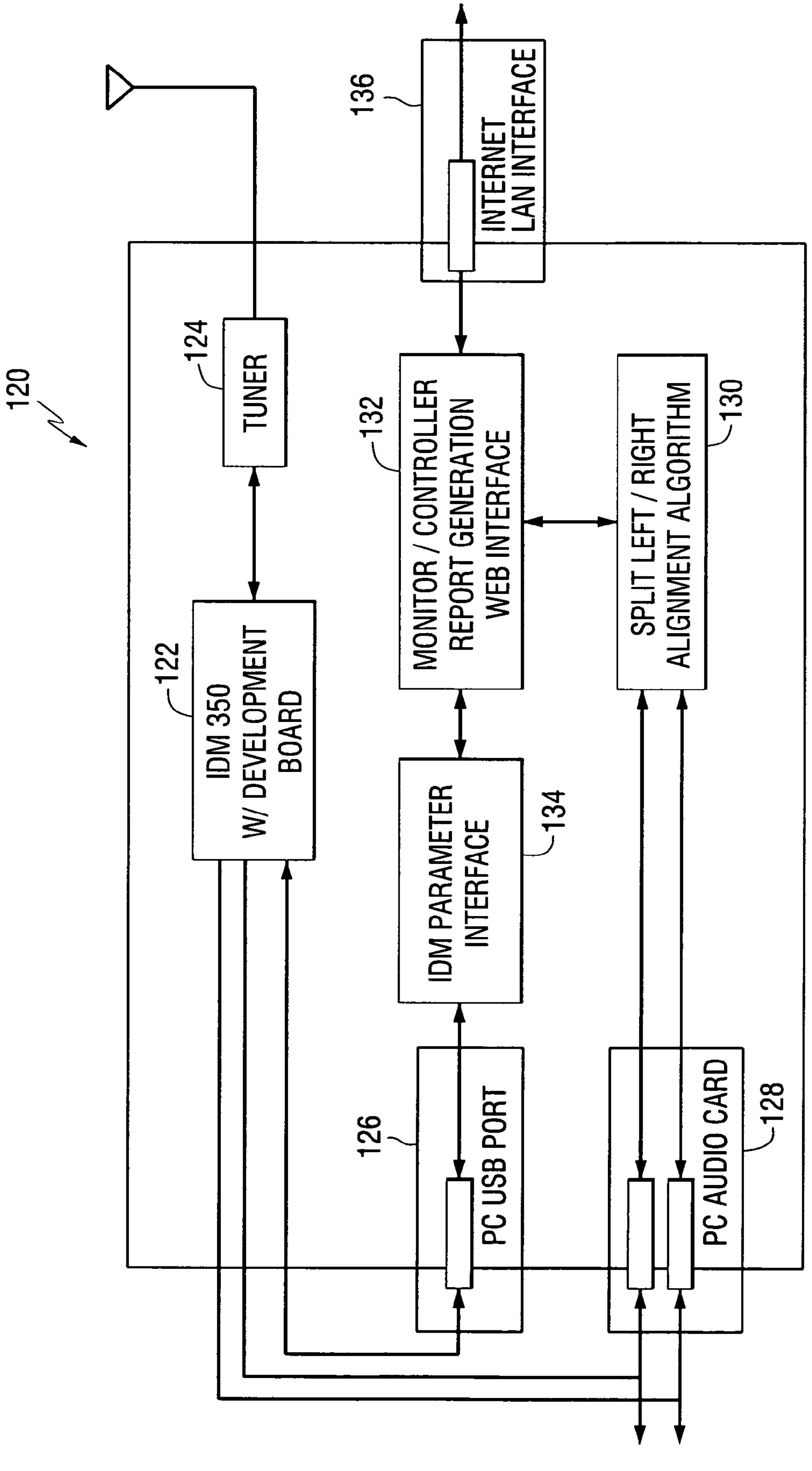
FIG. 5 is a block diagram of an HD Radio™ monitor.
Figure 6:
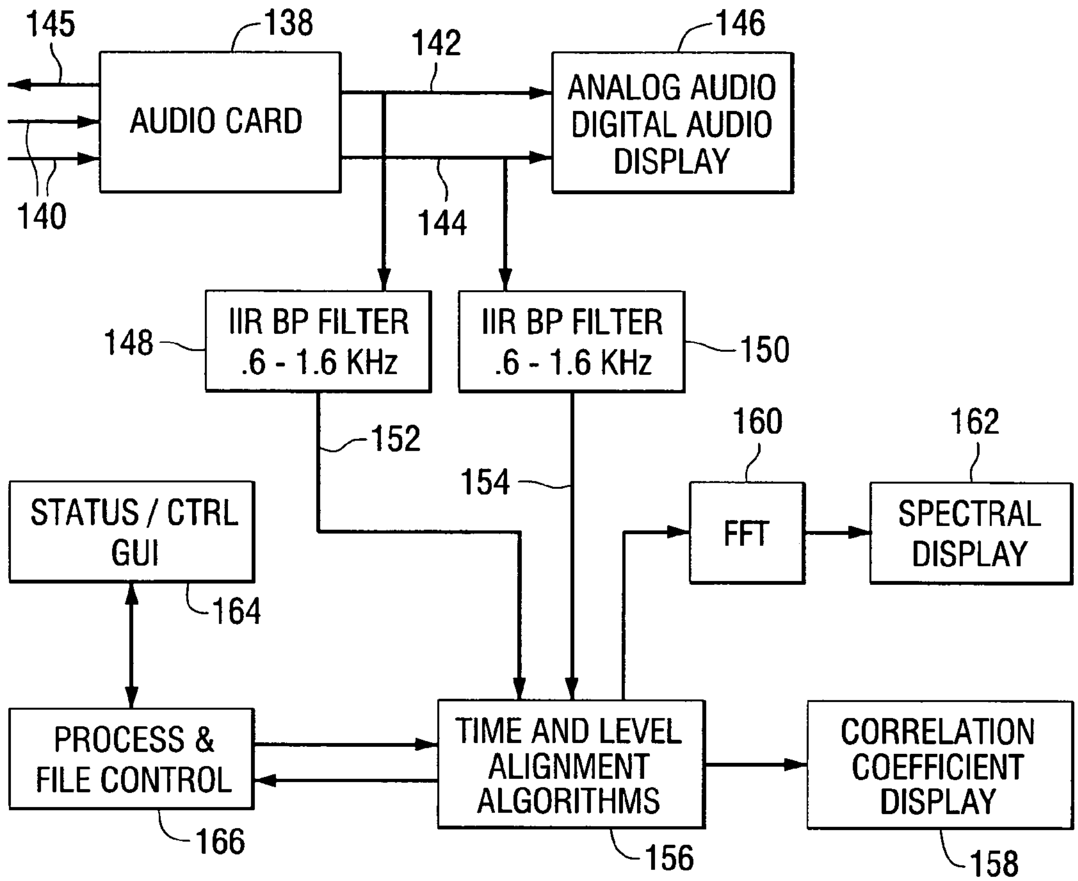
FIG. 6 is a block diagram of the analog/digital audio alignment monitor.

FIGS. 5 and 6 show additional details of a specific implementation which demonstrates the time and level alignment algorithms previously discussed. FIG. 5 is a block diagram of the system 120 that implements the time and level alignment algorithms. The platform is a PC with an HD Radio™ development board 122 and tuner 124. The BDM 350 HD Radio™ development board is controlled by way of a USB interface 126 in the PC. The split mode audio is output from the IDM 350 development board and input into the audio card 128 of a PC. A java application illustrated by block 130, and running on the PC, also outputs the split mode audio to the audio card for monitoring. In addition, the audio can be displayed on the screen 132 along with a plot of the correlation function across a selectable number of lags. The magnitude of the Fast Fourier Transform (FFT) of the analog and digital streams can be displayed to verify proper band selection. In addition to these outputs, there are a variety of selectable parameters 134 that can control the processing that are part of a control graphic interface. A network interface 136 can be provided to allow the exchange of information with a network. Alignment info is made available to user interface.

FIG. 6 is a block diagram of an HD Radio™ monitor. An audio card 138 receives that analog and digital audio signals, as illustrated by arrows 140, and provides the analog audio signal on line 142 and the digital audio signal on line 144. Arrow 145 illustrates a connection for optional audio monitoring. These signals are passed to a display 146. IIR filters 148 and 150 filter the analog audio and digital audio signals to produce filtered analog audio signals and filtered digital audio signals on lines 152 and 154. The timing and level alignment algorithms are applied to these filtered signals as illustrated by block 156. The calculated correlation coefficients are displayed as illustrated by block 158. A Fast Fourier Transform (FFT) 160 of the correlation coefficients is used to produce a spectral display 162. A graphical user interface 164 is provided to permit user control of the processes and files as illustrated by block 166.

Figure 7:
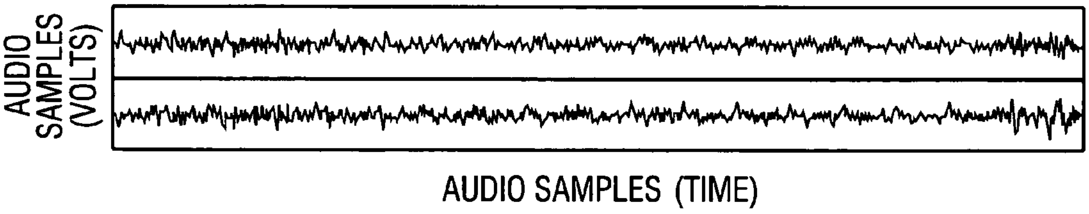
FIGS. 7, 8 and 9 are graphs illustrating the results of alignment measurements that can be displayed on a user interface.
Figure 8:
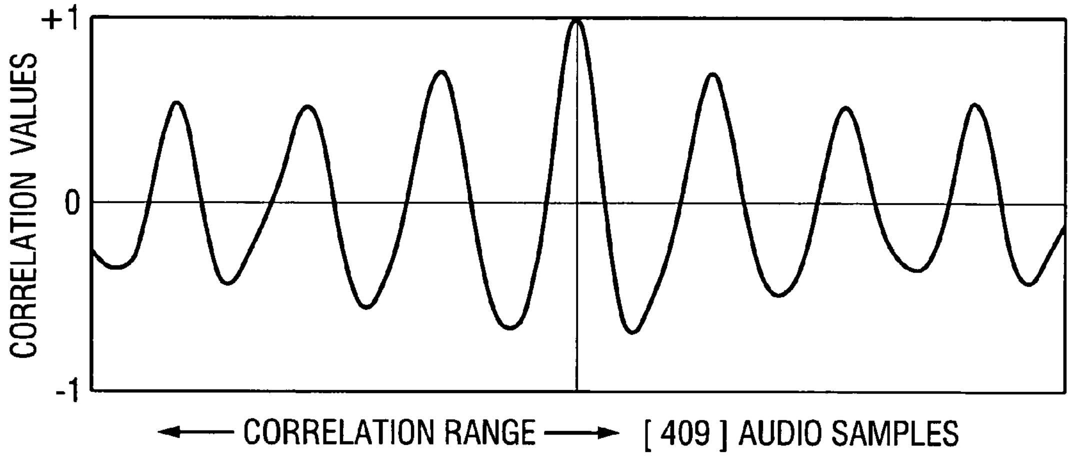
Figure 9:
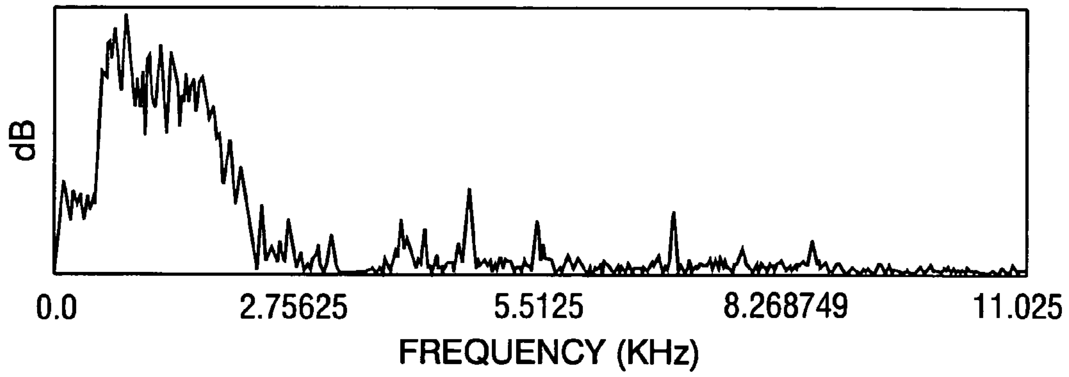

FIGS. 7, 8 and 9 illustrate typical correlations over the range of lags.

The various functions described above can be implemented using known filtering and processing hardware.

While the invention has been described in terms of several embodiments, it will be apparent to those skilled in the art that various changes can be made to the described embodiments without departing from the scope of the invention as set forth in the following claims.

What is claimed is:

1. A method comprising the steps of:

using a transmitter to transmit an analog audio signal and a digital audio signal in a hybrid waveform;

receiving the hybrid waveform including a carrier signal modulated by the analog audio signal and a plurality of subcarriers modulated by the digital audio signal;

filtering the analog audio signal to produce a filtered analog audio signal having a reduced bandwidth;

filtering the digital audio signal to produce a filtered digital audio signal having a reduced bandwidth;

using the filtered analog audio signal and the filtered digital audio signal to calculate a plurality of correlation coefficients, wherein the correlation coefficients are representative of time alignment between the analog audio signal and the digital audio signal; and adjusting the timing of the analog audio signal or the digital audio signal at the transmitter in response to the correlation coefficients.

2. The method of claim 1, the analog audio signal and the digital audio signal are sampled at the same sampling rate.

3. The method of claim 1, wherein:

the correlation coefficients are determined using a normalized cross-correlation function.

4. The method of claim 1, wherein:

dc components of the analog and digital audio signals are removed prior to determination of the correlation coefficients.

5. The method of claim 1, wherein:

the correlation coefficients approach 1 when the analog and digital audio signals are time aligned and the correlation coefficients become smaller as the time alignment error increases.

6. The method of claim 1, further comprising the step of:

performing a peak search over the correlation coefficients followed by a lower limiter on the correlation coefficients.

7. The method of claim 1, wherein:

the filtering steps use filters with passbands between about 600 Hz and about 1600 Hz.

8. The method of claim 1, further comprising the step of:

filtering the correlation coefficients using a moving average to produce an output signal that is representative of the number of samples that are misaligned.

9. A method of detecting level alignment of an analog audio signal and a digital audio signal in a hybrid radio system comprising the steps of:

receiving a hybrid waveform transmitted by a transmitter and including a carrier signal modulated by an analog audio signal and a plurality of subcarriers modulated by a digital audio signal;

filtering the analog audio signal to produce a filtered analog audio signal having a reduced bandwidth;

filtering the digital audio signal to produce a filtered digital audio signal having a reduced bandwidth;

computing the signal power of the analog audio signal and the signal power of the digital audio signal for an audio segment;

using a ratio of the signal power of the analog audio signal and the signal power of the digital audio signal to produce a signal representative of a level alignment of the analog audio signal and the digital audio signal; and adjusting the level of the analog audio signal or the digital audio signal at the transmitter in response the signal representative of a level alignment.

10. An apparatus comprising:

a transmitter for transmitting a hybrid waveform including a carrier signal modulated by an analog audio signal and a plurality of subcarriers modulated by a digital audio signal;

an input for receiving the hybrid waveform;

a first filter for filtering the analog audio signal to produce a filtered analog audio signal having a reduced bandwidth;

a second filter for filtering the digital audio signal to produce a filtered digital audio signal having a reduced bandwidth;

a processor for using the filtered analog audio signal and the filtered digital audio signal to calculate a plurality of correlation coefficients, wherein the correlation coefficients are representative of time alignment between the analog audio signal and the digital audio signal; and an audio processor for adjusting the timing of the analog audio signal or the digital audio signal at the transmitter in response to the correlation coefficients.

11. The apparatus of claim 10, further comprising:

a peak detector for detecting peaks in the correlation coefficients.

12. The apparatus of claim 10, wherein:

the first and second filters have passbands between about 600 Hz and about 1600 Hz.

13. The apparatus of claim 10, further comprising:

a third filter for filtering the correlation coefficients using a moving average to produce an output signal that is representative of the number of samples that are misaligned.

14. An apparatus comprising:

a transmitter for transmitting a hybrid waveform including a carrier signal modulated by an analog audio signal and a plurality of subcarriers modulated by a digital audio signal;

an input for receiving the hybrid waveform including a carrier signal modulated by an analog audio signal and a plurality of subcarriers modulated by a digital audio signal;

a first filter for filtering the analog audio signal to produce a filtered analog audio signal having a reduced bandwidth;

a second filter for filtering the digital audio signal to produce a filtered digital audio signal having a reduced bandwidth;

a processor for computing the signal power of the filtered analog audio signal and the signal power of the filtered digital audio signal for an audio segment, and for using a ratio of the signal power of the filtered analog audio signal and the signal power of the filtered digital audio signal to produce a signal representative of a level alignment of the analog audio signal and the digital audio signal; and an audio processor for adjusting the level of the analog audio signal or the digital audio signal at the transmitter in response to the signal representative of a level alignment.

15. The apparatus of claim 14, wherein:

the first and second filters have passbands between about 600 Hz and about 1600 Hz.

* * * * *